United States Patent
Gupta et al.

(10) Patent No.: US 6,917,483 B2
(45) Date of Patent: Jul. 12, 2005

(54) NON-CONSECUTIVE TRANSITIONAL MECHANISM FOR SEEK OPERATIONS WHEN TRANSITIONING FROM A SEEK CONTROL TO A TRACK FOLLOWING CONTROL

(75) Inventors: Avanindra Annu Gupta, Louisville, CO (US); Gregory Christopher Labbe, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 10/653,659

(22) Filed: Sep. 2, 2003

(65) Prior Publication Data

US 2005/0046984 A1 Mar. 3, 2005

(51) Int. Cl.$^7$ ............................ G11B 27/36; G11B 5/596
(52) U.S. Cl. ................... 360/31; 360/77.02; 360/78.06
(58) Field of Search .............................. 360/31, 53, 75, 360/77.02, 77.06, 77.08, 78.04, 78.06

(56) References Cited

U.S. PATENT DOCUMENTS

| | | | |
|---|---|---|---|
| 4,412,165 A | 10/1983 | Case et al. | |
| 4,740,736 A | 4/1988 | Sidman et al. | |
| 5,153,789 A | * 10/1992 | Bernett et al. | 360/78.04 |
| 5,233,486 A | 8/1993 | Albert | |
| 5,602,689 A | 2/1997 | Kadlec et al. | |
| 5,646,797 A | 7/1997 | Kadlec et al. | |
| 5,675,450 A | 10/1997 | Kadlec | |
| 5,872,672 A | 2/1999 | Chliwnyj et al. | |
| 5,914,829 A | 6/1999 | Kadlec et al. | |
| 6,153,997 A | * 11/2000 | Kobayashi et al. | 318/560 |
| 6,347,018 B1 | 2/2002 | Kadlec et al. | |
| 6,421,197 B1 | 7/2002 | Abdelnour | |

* cited by examiner

Primary Examiner—David Hudspeth
Assistant Examiner—Varsha A. Kapadia
(74) Attorney, Agent, or Firm—David K. Lucente; Derek J. Berger

(57) ABSTRACT

A method and apparatus for improving the settle time and thus, the transition from seek control to track following control in a disc drive system are provided. With the apparatus and method, two counters are provided—a consecutive counter and a non-consecutive counter. The consecutive counter counts consecutive samples that meet threshold requirements. The non-consecutive counter counts non-consecutive groups of consecutive samples that meet threshold requirements. When the consecutive counter reaches a first predetermined value, the non-consecutive counter is incremented and the consecutive counter is reset to zero. When the non-consecutive counter reaches a second predetermined value, a track following control mechanism is initiated to thereby transition from a seek control operation to a transitional control operation and finally a track following control operation.

20 Claims, 5 Drawing Sheets

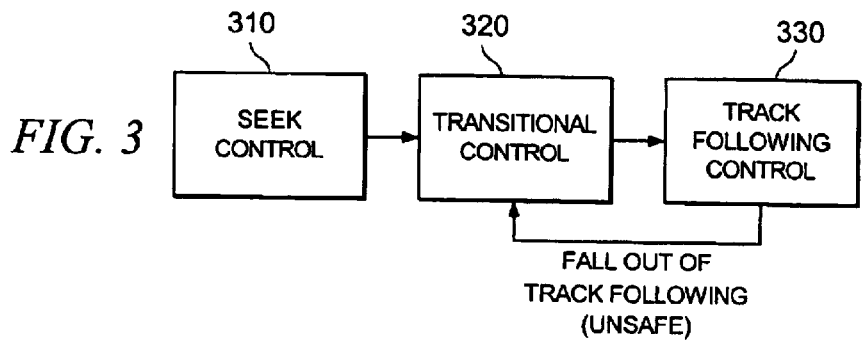
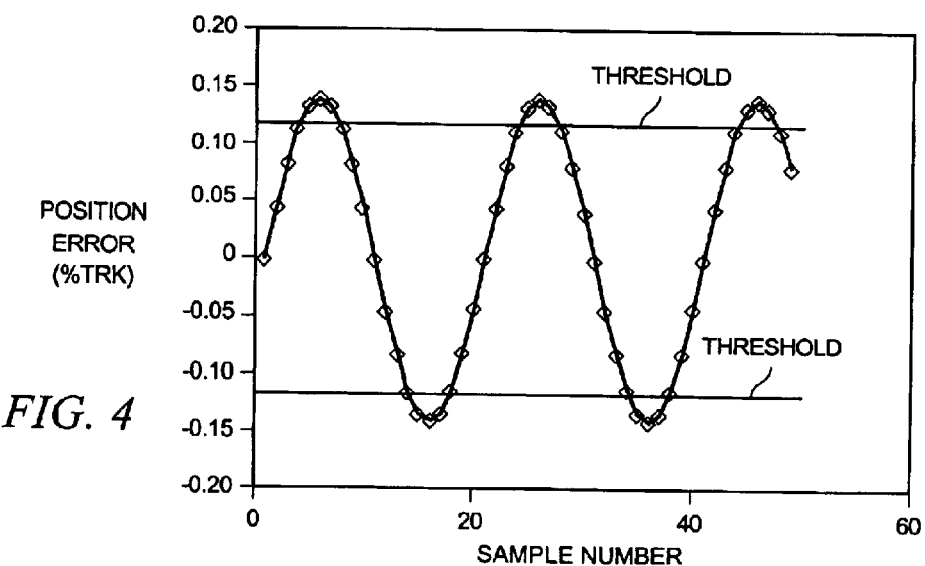
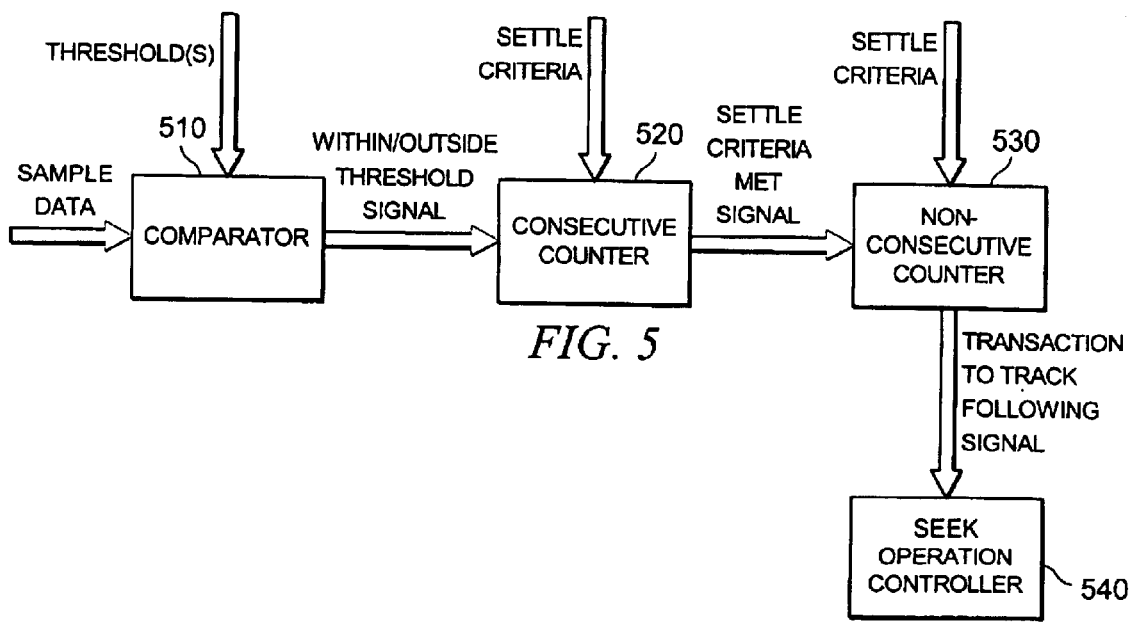

NON-CONSECUTIVE TRANSITIONAL MECHANISM FOR SEEK OPERATIONS WHEN TRANSITIONING FROM A SEEK CONTROL TO A TRACK FOLLOWING CONTROL

FIELD OF THE INVENTION

The present invention relates generally to the field of seek operation control in a disc drive. More particularly, the present invention relates to an apparatus and method for performing transitional control of a read/write head when the seek operation is transitioning from seek control to a track following control.

BACKGROUND OF THE INVENTION

Disc drives are commonly used in workstations, personal computers, laptops and other computer systems to store large amounts of data in a form that can be made readily available to a user. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer includes a read/write gap that contains the active elements of the transducer at a position suitable for interaction with the magnetic surface of the disc. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo system is typically used to control the position of the actuator arm to insure that the head is properly centered over the magnetic transitions during either a read or write operation. In a known servo system, servo position information is recorded on the disc surface between written data blocks, and periodically read by the head for use in a closed loop control of the voice coil motor to position the actuator arm. Such a servo arrangement is referred to as an embedded servo system.

In modern disc drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disc drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

The head structure also includes a slider having an air bearing surface that causes the transducer to fly above the data tracks of the disc surface due to fluid currents caused by rotation of the disc. Thus, the transducer does not physically contact the disc surface during normal operation of the disc drive to minimize wear at both the head and disc surface. The amount of distance that the transducer flies above the disc surface is referred to as the "fly height." By maintaining the fly height of the head at an even level regardless of the radial position of the head, it is ensured that the interaction of the head and magnetic charge stored on the media will be consistent across the disc.

When writing or reading information, the hard disc drive may perform a seek routine to move the transducers from one cylinder (track) to another cylinder. During the seek routine the voice coil motor is excited with a current to move the transducers to the new cylinder location on the disc surfaces. The controller also performs a servo routine to insure that the transducer moves to the correct cylinder location, and is at the center of the track. This servo routine is typically comprised of three primary algorithms: a seek control algorithm, a transitional control algorithm, and a track following control algorithm. The seek control algorithm is used to rapidly move the read/write head of the disc drive to a desired track on the disc. The track following control algorithm is used to control the position and velocity of the read/write head so that the head remains over the center of the desired track. The transitional control algorithm is used to transition from the seek control algorithm to the track following control algorithm by sampling position and velocity error measurements and based on these measurements, determining whether control should be passed to the track following control algorithm. The transitional control algorithm and track following control algorithm are together sometimes referred to as the track following-settle system.

The transitional control algorithm is very critical so that the read/write head does not fall out of the final track follow stage during reading or writing due to initial position or velocity errors. Known transitional control algorithms sample position and velocity error measurements and compare them to established thresholds. The known transitional control algorithm requires 8 consecutive samples whose position and velocity error measurements are within the established thresholds.

The position threshold, velocity threshold, and number of consecutive samples are used as the "tuners" for the track following settle system. That is, the values for the thresholds and number of consecutive samples may be adjusted to obtain different settling characteristics. However, it has been determined that adjusting these three parameters is not sufficient to provide acceptable read and write throughput performance.

Tightening the thresholds and increasing the number of consecutive samples for qualifying to transition to the track following control algorithm does provide low position and velocity errors, but it also increases the settle time unpredictably. This is because the consecutive sample based transitional algorithm may be restarted any number of times before the required number of consecutive samples falling within the established thresholds is encountered. That is, while accumulating the number of samples that fall within the established thresholds, if a sample exceeds a threshold, the count must be reset to zero and the process repeated, thus increasing the settle time for the read/write head.

The present invention provides a solution to this and other problems, and offers other advantages over previous solutions.

SUMMARY OF THE INVENTION

The present invention provides a method and apparatus for improving the settle time and thus, the transition from seek control to track following control in a disc drive system. With the present invention, two counters are provided—a consecutive counter and a non-consecutive counter. The consecutive counter counts consecutive samples that meet threshold requirements. The non-consecutive counter counts non-consecutive groups of consecutive samples that meet threshold requirements. When the consecutive counter reaches a first predetermined value, the non-consecutive counter is incremented and the consecutive counter is reset to zero. When the non-consecutive counter reaches a second predetermined value, a track following control mechanism is initiated to thereby transition from a seek control operation to a transitional control operation and finally a track following control operation.

These and various other features as well as advantages which characterize the present invention will be apparent upon reading of the following detailed description and review of the associated drawings.

BRIEF DESCRIPTION OF THE DRAWINGS

FIG. 3 is an exemplary diagram illustrating a control process for performing a seek operation.

FIG. 4 is an exemplary diagram illustrating the problem associated with consecutive settle criteria of known transitional control mechanisms.

FIG. 5 is an exemplary diagram illustrating an interaction of the primary operational elements in accordance with the present invention.

DETAILED DESCRIPTION

The present invention is directed to a mechanism for controlling the transition from seek control to track following control during a seek operation of a disc drive system. As such, in order to provide a context in which the present invention may be implemented, a brief description of the disc drive system is provided with reference to FIGS. 1 and 2.

Figure 1:
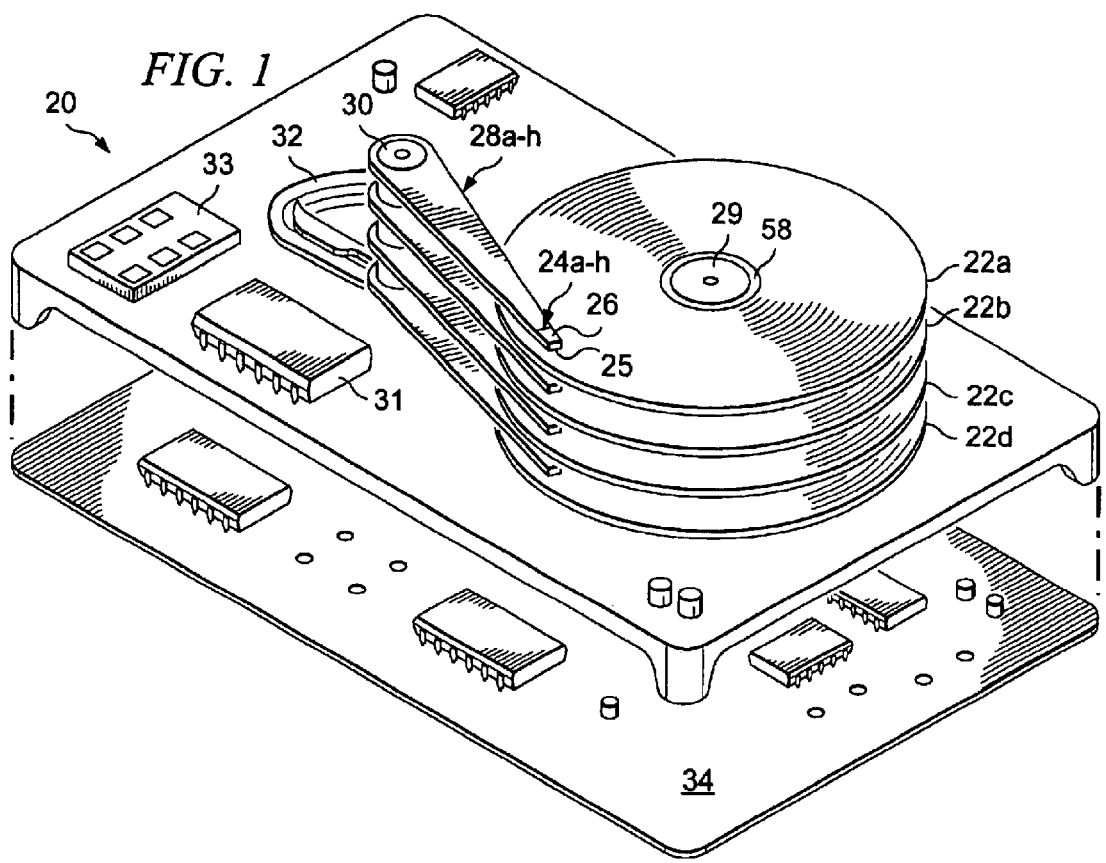
FIG. 1 is an exemplary diagram of a disc drive in accordance with the present invention.
Figure 2:
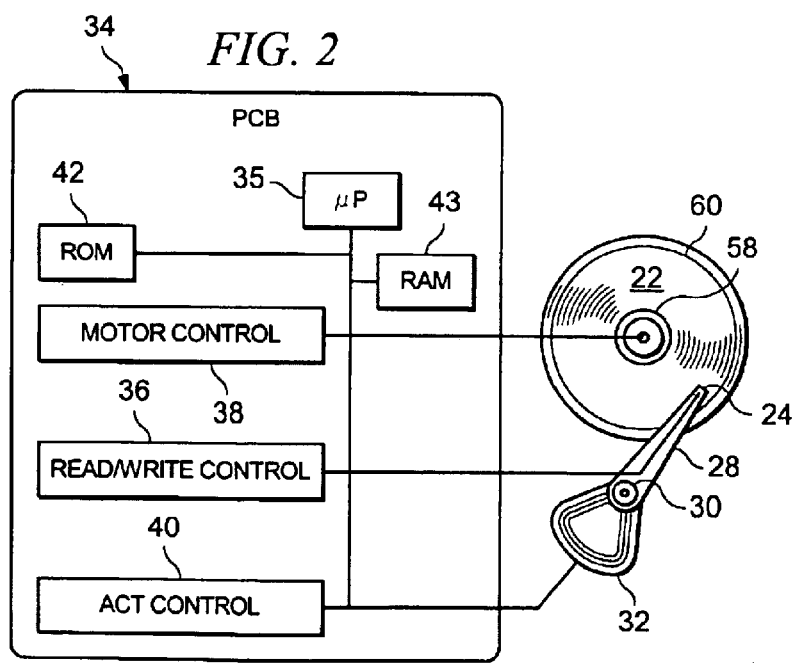
FIG. 2 is an exemplary block diagram of a printed circuit board and its electrical couplings in accordance with the present invention.

Referring now to the drawings, and initially to FIG. 1, there is illustrated an example of a disc drive designated generally by the reference numeral 20. The disc drive 20 includes a stack of storage discs 22a–d and a stack of read/write heads 24a–h. Each of the storage discs 22a–d is provided with a plurality of data tracks to store user data. As illustrated in FIG. 2, one head is provided for each surface of each of the discs 22a–d such that data can be read from or written to the data tracks of all of the storage discs. The heads are coupled to a pre-amplifier 31. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Referring now to FIG. 2, there is illustrated in schematic form of the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage.

As previously mentioned, the present invention provides a mechanism for improving the settle time during a transitional control stage of a seek operation. FIG. 3 is an exemplary diagram illustrating a control process for performing a seek operation. As shown in FIG. 3, the control process involves a seek control portion 310 which is used to rapidly bring the read/write head to a position relatively close to the desired track on the disc. Once the read/write head is within a tolerance of the desired track, control passes to the transitional control portion 320 which is used to control the read/write head so that it settles over the center of the desired track. Once a predetermined criteria is satisfied, e.g., a predetermined number of samples of position and velocity errors fall within given thresholds, the control is passed to the track following control portion 330 which maintains the position and velocity of the read/write head relative to the desired track.

As previously mentioned, in known systems, the transitional control portion 320 takes samples of the position and velocity error, i.e. the difference between a measured position and velocity and a desired position and velocity, to determine if a predetermined number of consecutive samples fall within established thresholds. Only when the predetermined number of consecutive samples fall within established thresholds is the control passed to the track following control portion 330.

This approach has a number of drawbacks some of which have been touched on above. First, because of the rigid nature of the requirement, the count of the number of consecutive samples falling within the established threshold may be restarted multiple times before a group of consecutive samples is identified that meet the requirements. This problem is illustrated in FIG. 4. The example shown in FIG. 4 is for a consecutive settle criteria of 8 samples between the designated thresholds. As shown in FIG. 4, a plurality of samples may be taken that fall within the predetermined thresholds but may not be enough to satisfy the consecutive settle criteria. That is, as shown, there may be 7 samples that all fall within the established thresholds but an eighth sample may exceed the thresholds. This may be due to noise, for example.

Once this eighth sample is determined to have exceeded the thresholds, the number of consecutive samples falling within the established thresholds is reinitialized to zero and the process must repeat. Thus, it may take many samples and a much longer time for the transitional control portion to determine that the read/write head has settled to a point that control may be passed to the track following control portion.

Another drawback to the known consecutive settle criteria based transitional control systems is that the number of unsafe track following control transitions made is relatively large. An unsafe track following control transition (or simply an "unsafe") is a transition to the track following control portion which eventually results in the control falling out of the track following control portion. That is, the position error and/or velocity error become large enough that the track following control portion cannot adequately handle it and control must be returned to the transitional control portion. This may result in write failures, for example.

The present invention avoids the problems of the known transitional control algorithms due to the retriggering of the consecutive settle counter because sampled position or velocity errors exceed established thresholds. The present invention avoids these problems by providing a mechanism by which the number of retriggers experienced before transitioning to the track following control portion is reduced.

The mechanism of the present invention includes both a consecutive settle counter (or simply consecutive counter) and a non-consecutive settle counter (or simply non-consecutive counter). The combination of these two counters is used to determine when the control of the read/write head may be passed to a track following control algorithm from the transitional control algorithm. That is, the counters may be set to identify the number of non-consecutive groups of consecutive samples that must have position and/or velocity errors within the predetermined threshold(s). Thus, rather than merely requiring a certain number of consecutive samples that fall within the thresholds, the present invention provides a mechanism for loosening these requirements by allowing for a certain number of non-consecutive groups of consecutive samples to be the instigator of the track following control algorithm.

With the present invention, samples of position and/or velocity errors are taken in a manner generally known in the art. The position and/or velocity errors are compared to thresholds that are established, for example, during calibration of the disc drive. If the position and/or velocity error falls within the established thresholds, i.e. does not meet or exceed the thresholds, then the consecutive counter is incremented.

The consecutive counter and the non-consecutive counter have upper values, or settle criteria, which identify when an event is triggered. For example, the consecutive counter has an upper value or settle criteria that triggers incrementing of the non-consecutive counter. The non-consecutive counter has an upper value or settle criteria that triggers the transition of the control of the read/write head to the track following control portion 330. When the upper value or settle criteria of the consecutive counter is met, the non-consecutive counter is incremented. Once the non-consecutive counter requirements are met, i.e. the upper value or settle criteria of the non-consecutive counter is met, then the control of the read/write head is passed to the track following control portion 330.

With the combination of the consecutive counter and the non-consecutive counter, various arrangements of settle criteria may be established based on the particular implementation of the present invention. For example, with the present invention, the number of consecutive samples falling within the thresholds may be set to 1 and the number of non-consecutive groups of samples falling within the thresholds may be set to 14. As a result of this combination of settle criteria, each sample whose position and/or velocity error falls within the established thresholds will cause the consecutive counter to increment. Since the requirement of the consecutive counter is that there be 1 consecutive sample that falls within the established thresholds, then when the consecutive counter is incremented, the non-consecutive counter is also incremented. Once the non-consecutive counter reaches its requirement of 14, the control operation is passed to the track following control portion. Thus, with this particular setting of counter criteria, any 14 consecutive or non-consecutive samples falling within the established threshold will satisfy the settle requirements for transitioning control to the track following control portion.

As another example, assume that the consecutive counter requirement is set to 2 and the non-consecutive counter requirement is set to 8. This may be referred to as requiring 8 non-consecutive groups of 2 samples whose position and/or velocity errors are within the established thresholds. Thus, the non-consecutive counter is only incremented when the consecutive counter reaches a count of 2. Once the consecutive counter reaches 2, the consecutive counter is reinitialized to zero and the non-consecutive counter is incremented by 1. Once the non-consecutive counter reaches a count of 8, the control is transitioned to the track following control portion. Other combinations of consecutive counter requirements and non-consecutive counter requirements may be used without departing from the spirit and scope of the present invention.

FIG. 5 is an exemplary diagram illustrating an interaction of the primary operational elements in accordance with the present invention. The operational elements shown in FIG. 5 may be implemented as hardware, software, or any combination of hardware and software. In a preferred embodiment, the operational elements are implemented as software instructions executed by one or more processors. For example, the operational elements of FIG. 5 may be software instructions executed by the actuator controller 40 of FIG. 2. Alternatively, the operational elements of FIG. 5 may be implemented as circuitry in the actuator controller 40 or separate circuitry on the printed circuit board 34 of FIG. 2.

As shown in FIG. 5, sampled data, such as position and/or velocity error data is input to a comparator 510. The sampled data is compared to threshold information obtained from a threshold(s) established during a calibration of the disc drive. The results of the comparison by the comparator 510 are output to the consecutive counter 520. These results may be either a signal indicating that the sample data is within the threshold(s) or is outside the threshold(s).

Based on the results output by the comparator 510, the consecutive counter 520 may either increment itself or reset to a zero value. If the consecutive counter 520 receives results from the comparator 510 indicating that the sample data is within the threshold(s), then the consecutive counter 520 is incremented. If the consecutive counter 520 receives results from the comparator 510 indicating that the sample data is outside the threshold(s), then the consecutive counter 520 is reset to zero.

In addition to the above, the consecutive counter 520 determines if it has reached an upper limit or settle criteria. If the upper limit or settle criteria is reached by the consecutive counter 520, a settle criteria met signal is sent to the non-consecutive counter 530. The consecutive counter 520 is then reset to zero.

The non-consecutive counter 530, upon receiving a settle criteria met signal from the consecutive counter 520, increments itself. The non-consecutive counter 530 then determines if an upper limit or settle criteria established for the non-consecutive counter 530 has been reached. If so, a transition to track following signal is sent to a seek operation controller 540. The seek operation controller 540, upon receiving the transition to track following signal, begins controlling the position and velocity of the read/write head using a track following control algorithm.

Figure 6:
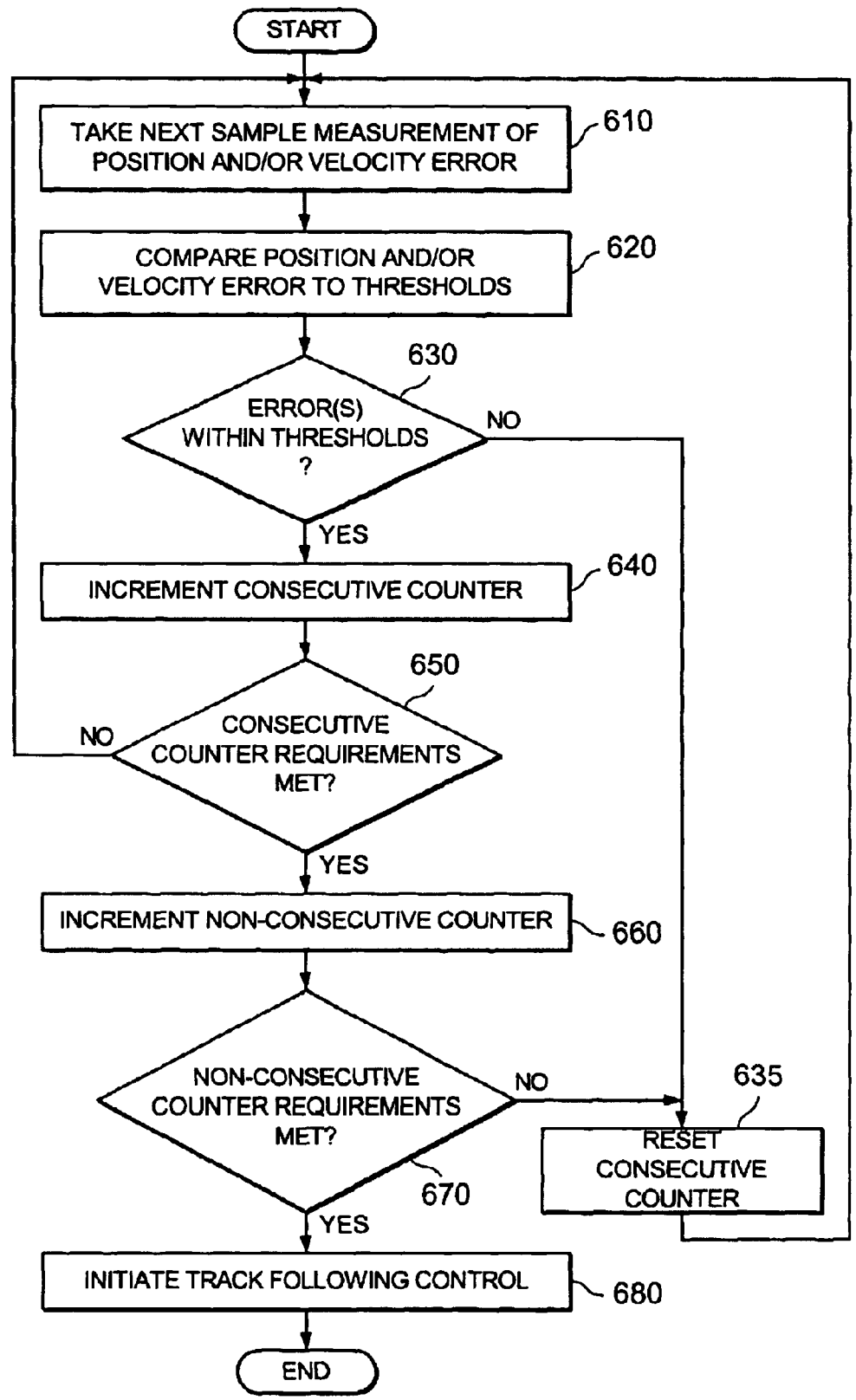
FIG. 6 is a flowchart outlining an exemplary operation of the present invention when performing a non-consecutive settle transitional control during a seek operation.

FIG. 6 is a flowchart outlining an exemplary operation of the present invention when performing a non-consecutive settle transitional control during a seek operation. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts by taking the next sample measurement of the position and/or velocity error of the read/write head (step 610). The position and/or velocity error are compared to established threshold(s) (step 620) and a determination is made as to whether the position and/or velocity error are within the established threshold(s) (step 630). If not, the consecutive counter is rest (step 635) and the operation returns to step 610. Otherwise, if the position and/or velocity error is within the established threshold(s), the consecutive counter is incremented (step 640).

A determination is then made as to whether the consecutive counter requirements have been met (step 650). That is, it is determined whether the upper limit or settle criteria established for the consecutive counter are achieved by the current count of the consecutive counter. If not, the operation returns to step 610. If the consecutive counter requirements have been met, then the non-consecutive counter is incremented (step 660).

A determination is then made as to whether the non-consecutive counter requirements have been met (step 670). That is, it is determined whether the upper limit or settle criteria established for the non-consecutive counter are achieved by the current count of the non-consecutive counter. If not, the consecutive counter is reset (step 635) and the operation returns to step 610. If the non-consecutive counter requirements are met, the track following control is initiated (step 680).

Thus, the present invention provides a mechanism by which the instigator for transitioning control to a track following algorithm is a predetermined number of non-consecutive groups of consecutive samples meeting threshold requirements. Because the present invention allows for non-consecutive groups to satisfy the requirements for transitioning to a track following control algorithm, the settle time distribution tends to be much more consistent for the present invention as opposed to the consecutive settle criteria of known systems.

Figure 7:
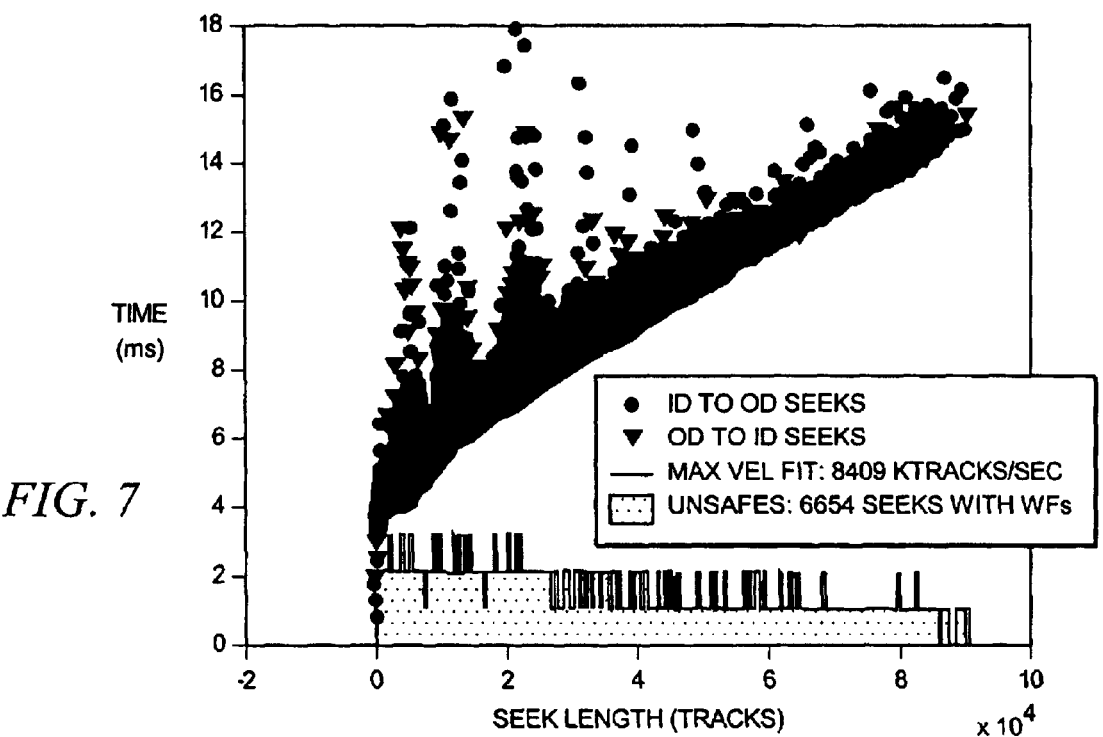
FIG. 7 is an exemplary diagram illustrating a distribution of settle times for a known consecutive settle transitional control mechanism.

FIG. 7 is an exemplary diagram illustrating a distribution of settle times for a known consecutive settle transitional control mechanism. As shown in FIG. 7, the settle time for various seek lengths where the seek is from either the inner diameter (ID) to the outer diameter (OD) or vice versa, tends to be scattered between 4 and 18 ms. For example, as shown in FIG. 7, the seek times experienced for a seek length of $2 \times 10^4$ tracks, range from approximately 7 ms to 18 ms. In addition, the number of unsafes, i.e. the number of transitions to the track following control algorithm that result in the read/write head falling out of track following and causing write faults, is quite large (6654 seeks with write faults in the depicted example).

Figure 8:
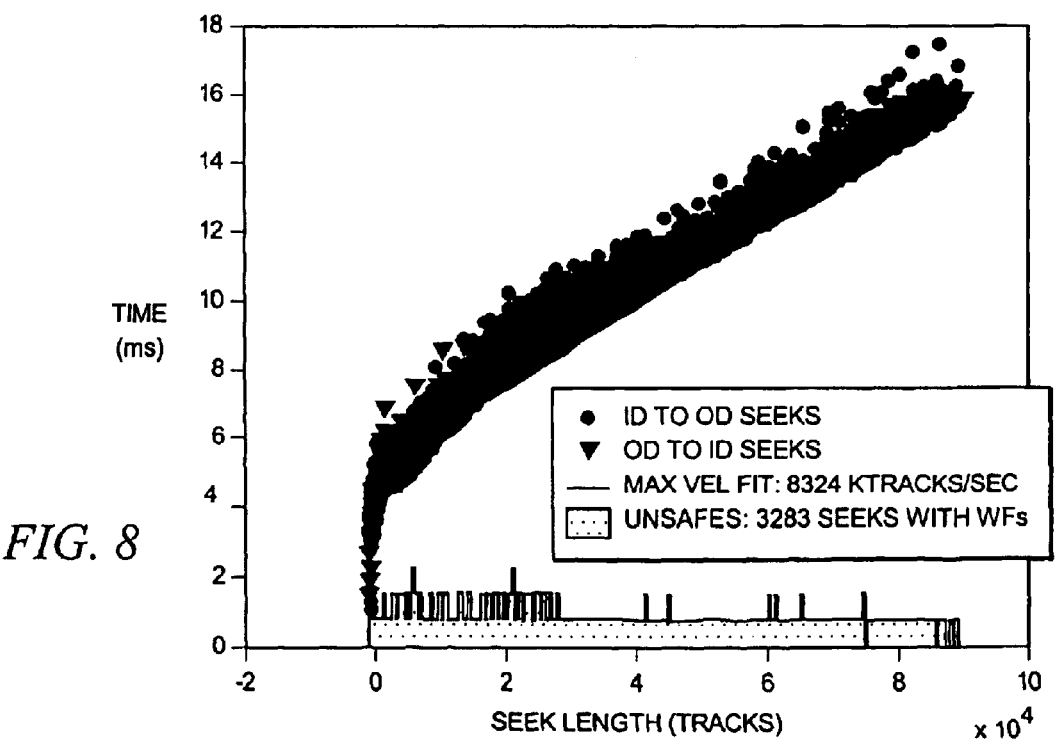
FIG. 8 is an exemplary diagram illustrating a distribution of settle times for the non-consecutive settle transitional control mechanism of the present invention.

FIG. 8 is an exemplary diagram illustrating a distribution of settle times for the non-consecutive settle transitional control mechanism of the present invention. As shown in FIG. 8, the seek times are not as scattered for the non-consecutive settle transitional control mechanism of the present invention when compared to the consecutive settle control mechanism of the known system illustrated in FIG. 7. For example, for a seek length of $2 \times 10^4$ tracks, the seek time is between approximately 7.5 ms and 10 ms. Moreover, the number of unsafes is reduced to less than half of those shown in FIG. 7.

Figure 9A:
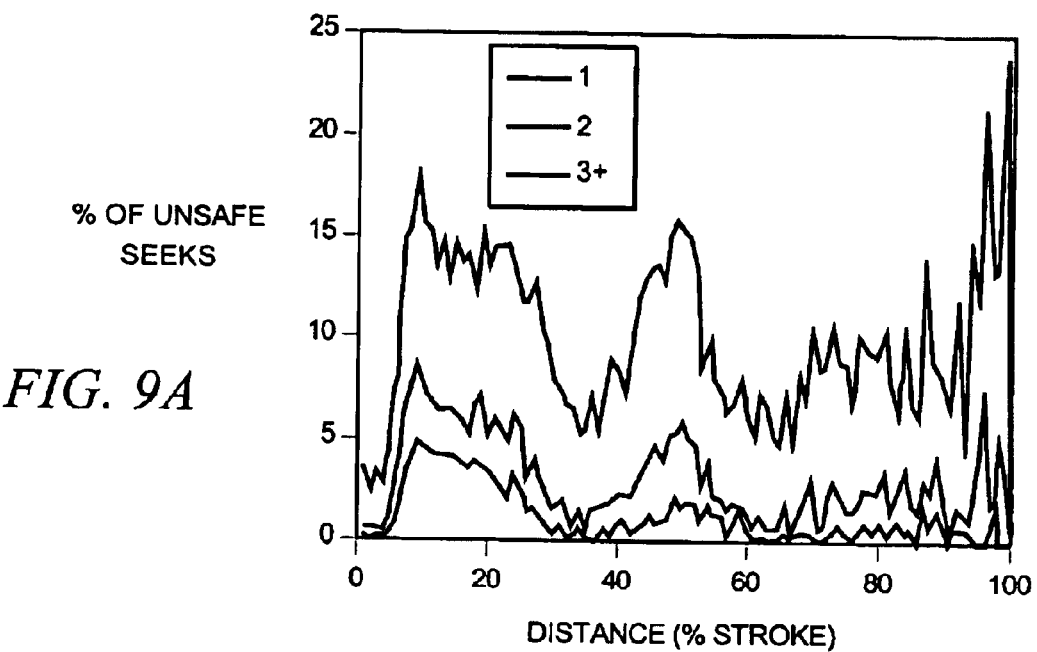
FIGS. 9A and 9B are exemplary diagrams illustrating a comparison between the number of unsafe transitions for a known consecutive settle transitional control mechanism and the number of unsafe transitions for the non-consecutive settle transitional control mechanism of the present invention.
Figure 9B:
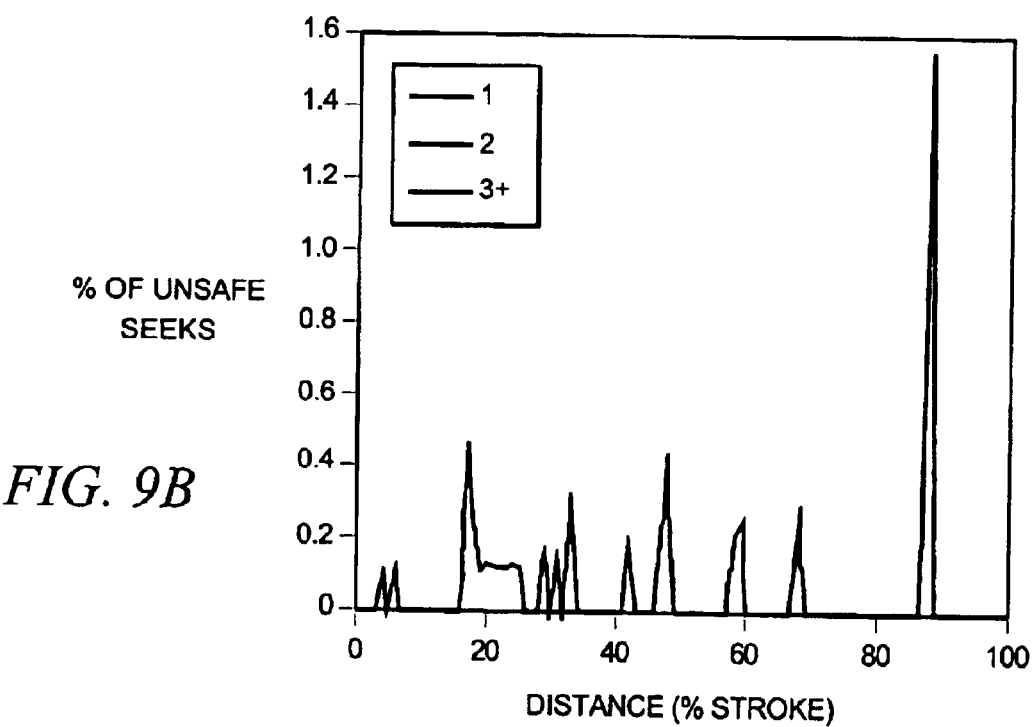

FIGS. 9A and 9B are exemplary diagrams illustrating a comparison between the number of unsafe transitions for a known consecutive settle transitional control mechanism and the number of unsafe transitions for the non-consecutive settle transitional control mechanism of the present invention. As shown in FIG. 9A, the percentage of seeks that were unsafe in relation to the percentage of the stroke is quite large for every distance measurement in the known consecutive settle criteria based control mechanism. However, as shown in FIG. 9B, for the non-consecutive settle criteria based control mechanism, there are distances where there are no unsafe seeks and the distances where there are unsafe seeks (with the exception of the spike appearing at approximately 85–90% stroke) tend to have a smaller number of unsafe seeks than the consecutive settle criteria based control mechanism. The average percentage of unsafe seeks for the known consecutive settle criteria based control mechanism is approximately 10.26% of the seeks while the average percentage of unsafe seeks for the non-consecutive settle criteria based control mechanism of the present invention is approximately 0.06% of the seeks.

Thus, by using a the non-consecutive settle criteria of the present invention, increased throughput of the disc drive system may be achieved by reducing the amount of settle time and making the settle time more consistent between seek operations of the same length. In addition, the number of unsafe seeks is reduced dramatically thereby reducing the number of write failures of the disc drive system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:

counting a number of non-consecutive groups of consecutive samples meeting a predetermined threshold requirement;

determining if a count of the number of non-consecutive groups of consecutive samples meeting a predetermined threshold requirement meets a settle criteria; and transitioning from a seek control operation to a track following control operation in response to determining that the count of the number of non-consecutive groups of consecutive samples meeting the predetermined threshold requirement meets the settle criteria.

2. The method of claim 1, wherein counting a number of non-consecutive groups of consecutive samples meeting a predetermined threshold requirement includes:

incrementing a consecutive counter if a sample is within the predetermined threshold requirement; and incrementing a non-consecutive counter based on a current count of the consecutive counter.

3. The method of claim 2, wherein the consecutive counter has an associated first settle criteria of n number of consecutive samples, and wherein the non-consecutive counter has an associated second settle criteria of m number of non-consecutive groups of consecutive samples.

4. The method of claim 3, wherein the non-consecutive counter is incremented in response to a current count of the consecutive counter being equal to n.

5. The method of claim 4, wherein the consecutive counter is reset such that a current count of the consecutive counter is zero in response to incrementing the non-consecutive counter.

6. The method of claim 3, wherein the seek control operation is transitioned to a track following control operation in response to a current count of the non-consecutive counter being equal to m.

7. A method of transitioning from a seek control operation to a track following operation in a disc drive system, comprising:

sampling a metric of a read/write head of the disc drive system;

comparing the metric to a threshold;

determining if the metric is within the threshold or exceeds the threshold;

incrementing a consecutive counter if the metric is within the threshold;

determining if a current count of the consecutive counter is a first predetermined value;

incrementing a non-consecutive counter if the consecutive counter is the first predetermined value;

determining if a current count of the non-consecutive counter is a second predetermined value; and initiating the track following operation if the current count of the non-consecutive counter is the second predetermined value.

8. The method of claim 7, wherein the first predetermined value is n number of consecutive samples, and wherein the second predetermined value is m number of non-consecutive groups of consecutive samples.

9. The method of claim 8, wherein the track following operation is initiated in response to a count of the non-consecutive counter indicates that m number of non-consecutive groups of n consecutive samples have been encountered.

10. The method of claim 7, wherein the consecutive counter is reset such that a current count of the consecutive counter is zero in response to incrementing the non-consecutive counter.

11. The method of claim 7, wherein the metric is a position error of the read/write head.

12. The method of claim 7, wherein the metric is a velocity error of the read/write head.

13. The method of claim 7, wherein the metric includes both a position error and a velocity error of the read/write head.

14. A controller, comprising:

a comparator;

a consecutive counter coupled to the comparator; and a non-consecutive counter coupled to the consecutive counter;

wherein the comparator receives sampled data, compares the sampled data to a threshold, and outputs a result of the comparison, wherein the consecutive counter either increments or resets based on the results of the comparison, wherein the non-consecutive counter increments when a count of the consecutive counter reaches a first predetermined value, and wherein the non-consecutive counter initiates a transition of control to a track following control when a count of the non-consecutive counter reaches a second predetermined value.

15. The apparatus of claim 14, wherein the first predetermined value is n number of consecutive samples, and wherein the second predetermined value is m number of non-consecutive groups of consecutive samples.

16. The apparatus of claim 15, wherein the non-consecutive counter is incremented in response to a current count of the consecutive counter being equal to n.

17. The apparatus of claim 16, wherein the consecutive counter is reset such that a current count of the consecutive counter is zero in response to incrementing the non-consecutive counter.

18. The apparatus of claim 14, wherein the non-consecutive counter initiates the transition of control to the track following control operation in response to a current count of the non-consecutive counter indicating that m number of non-consecutive groups of n consecutive samples have been encountered.

19. The apparatus of claim 14, wherein the sampled data includes position error data of a read/write head of a disc drive.

20. The apparatus of claim 14, wherein the sampled data includes velocity error data of a read/write head of a disc drive.

* * * * *